US012679095B2

(12) United States Patent
Kawamata et al.

(10) Patent No.: US 12,679,095 B2
(45) Date of Patent: Jul. 14, 2026

(54) PRINTING SYSTEM INCLUDING A PRETREATMENT-HEAD CAPPING MECHANISM WITH DUAL-POSITION OPERATION

(71) Applicant: BROTHER KOGYO KABUSHIKI KAISHA, Nagoya (JP)

(72) Inventors: Noriyuki Kawamata, Nagoya (JP); Akihito Kobayashi, Konan (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 205 days.

(21) Appl. No.: 18/590,255

(22) Filed: Feb. 28, 2024

(65) Prior Publication Data

US 2024/0326438 A1 Oct. 3, 2024

(30) Foreign Application Priority Data

Mar. 29, 2023 (JP) ................................ 2023-053958

(51) Int. Cl.
*B41J 2/165* (2006.01)
*B41J 2/17* (2006.01)
(Continued)

(52) U.S. Cl.
CPC ......... *B41J 2/16511* (2013.01); *B41J 2/1714* (2013.01); *B41J 11/0015* (2013.01);
(Continued)

(58) Field of Classification Search
CPC .. B41J 2/16511; B41J 2/1714; B41J 11/0015; B41J 11/0095; B41J 11/06;
(Continued)

(56) References Cited

U.S. PATENT DOCUMENTS

2007/0200888 A1* 8/2007 Inoue .................. B41J 13/0045 347/102
2011/0234663 A1* 9/2011 Ohhashi ............... B41J 2/16588 347/9

(Continued)

FOREIGN PATENT DOCUMENTS

JP 2016002726 A 1/2016

*Primary Examiner* — Henok D Legesse

(74) *Attorney, Agent, or Firm* — HOGAN LOVELLS US LLP

(57) ABSTRACT

There is provided a printing apparatus including: a platen configured to convey, in a conveying direction, a printing medium to be subjected to a pretreatment for applying a pretreatment agent before or after the platen is located at a set position; an ejection head having a nozzle surface provided with a nozzle and configured to perform an ejection process of ejecting a liquid from the nozzle onto the printing medium conveyed by the platen at a printing position; a cap configured to cover the nozzle surface; and a cap switching mechanism configured to switch a position of the cap between a capping position where the nozzle surface is covered with the cap and an uncapping position where the nozzle surface and the cap are separated from each other, wherein the cap switching mechanism moves the cap to the uncapping position after a printing start instruction is received.

8 Claims, 8 Drawing Sheets

(51) Int. Cl.
*B41J 11/00* (2006.01)
*B41J 11/06* (2006.01)
*B41J 13/00* (2006.01)

(52) U.S. Cl.
CPC ............ *B41J 11/0095* (2013.01); *B41J 11/06* (2013.01); *B41J 13/0018* (2013.01); *B41J 13/0027* (2013.01); *B41J 13/0045* (2013.01)

(58) Field of Classification Search
CPC ................ B41J 13/0018; B41J 13/0027; B41J 13/0045; B41J 2/16508; B41J 2/2114; B41J 3/4078
See application file for complete search history.

(56) References Cited

U.S. PATENT DOCUMENTS

| | | | | |
|---|---|---|---|---|
| 2012/0081438 | A1* | 4/2012 | Shimizu | B41J 2/2114 347/14 |
| 2015/0367658 | A1 | 12/2015 | Mashima et al. | |
| 2020/0101782 | A1* | 4/2020 | Sekiguchi | B41J 11/0024 |

* cited by examiner

PRINTING SYSTEM INCLUDING A PRETREATMENT-HEAD CAPPING MECHANISM WITH DUAL-POSITION OPERATION

REFERENCE TO RELATED APPLICATIONS

This application claims priority from Japanese Patent Application No. 2023-053958 filed on Mar. 29, 2023. The entire content of the priority application is incorporated herein by reference.

BACKGROUND ART

In the related art, a printing apparatus that performs printing on a printing medium placed on a tray movable in a conveying direction is known. For example, a printing apparatus temporarily conveys a printing medium set in a tray at a set position to a printing start position along a setting direction, and then performs printing while conveying the printing medium from the printing start position in an opposite direction of the setting direction.

SUMMARY

There is a printing apparatus that applies a pretreatment agent to a printing medium. The pretreatment agent may contain a component for fixing an ink. When a pretreatment agent containing an acid or a salt is applied in the printing apparatus in the related art, a part of the pretreatment agent may become a mist inside a printer and float inside the printer, and the acid or the like volatilizes from the pretreatment agent applied to the printing medium. Therefore, the volatilized acid or the mist reacts with the ink in a nozzle, and the ink is fixed. As a result, there is a possibility that failures such as non-ejection of the ink or discoloration of the ink on the printing medium occur.

An object of the present disclosure is to provide a printing apparatus capable of reducing the possibility of occurrence of failures caused by a reaction of a component such as an acid contained in a pretreatment agent with an ink.

A printing apparatus according to the present disclosure includes: a platen configured to convey, in a conveying direction, a printing medium to be subjected to a pretreatment for applying a pretreatment agent containing any one of an acid, a salt, and an acid and a salt before or after the platen is located at a set position; an ejection head having a nozzle surface provided with a nozzle and configured to perform an ejection process of ejecting a liquid from the nozzle onto the printing medium conveyed by the platen at a printing position that is located at a downstream position in the conveying direction with respect to the set position; a cap configured to cover the nozzle surface; and a cap switching mechanism configured to switch a position of the cap between a capping position where the nozzle surface is covered with the cap and an uncapping position where the nozzle surface and the cap are separated from each other. The cap switching mechanism moves the cap to the uncapping position after a printing start instruction is received.

According to the present disclosure, the pretreatment is performed on the printing medium before or after the printing medium is located at the set position. That is, an aspect in which a pretreatment device that performs the pretreatment is provided separately from the printing apparatus (including an aspect in which a user manually performs the pretreatment on the printing medium before the printing medium is set in the printing apparatus) can be adopted, or an aspect in which the pretreatment device is provided in the printing apparatus as a component of the printing apparatus. In the aspect in which the pretreatment device is provided separately from the printing apparatus, by moving the cap to the uncapping position after receiving the printing start instruction, the possibility that the acid or the like volatilized from the pretreatment agent applied to the printing medium W reacts with the ink in the nozzle before receiving the printing start instruction can be reduced. Accordingly, the possibility of occurrence of failures such as non-ejection caused by fixing of the ink due to the reaction or discoloration of the ink on the printing medium can be reduced.

DESCRIPTION

Hereinafter, a printing apparatus according to an embodiment of the present disclosure will be described with reference to the drawings. The printing apparatus to be described below is merely an embodiment of the present disclosure. Accordingly, the present disclosure is not limited to the following embodiment, and can be added, deleted, or modified without departing from the scope of the present disclosure.

A printing apparatus 100 of the present embodiment performs printing by ejecting ink droplets of an ink as an example of a liquid onto a printing medium which is, for example, a fabric made of polyester. The printing apparatus 100 prints a color image on a printing medium by ejecting ink droplets of yellow (Y), magenta (M), cyan (C), and black (K) inks, which are collectively referred to as color inks, onto the printing medium. In a case of printing a color image on a printing medium, for example, ink droplets of a white ink (W) are first ejected as a base ink in order to reduce an influence on a color and a material of the fabric, and ink droplets of color inks are ejected on the ink droplets. Hereinafter, a configuration of the printing apparatus 100 will be described in detail.

Figure 1:
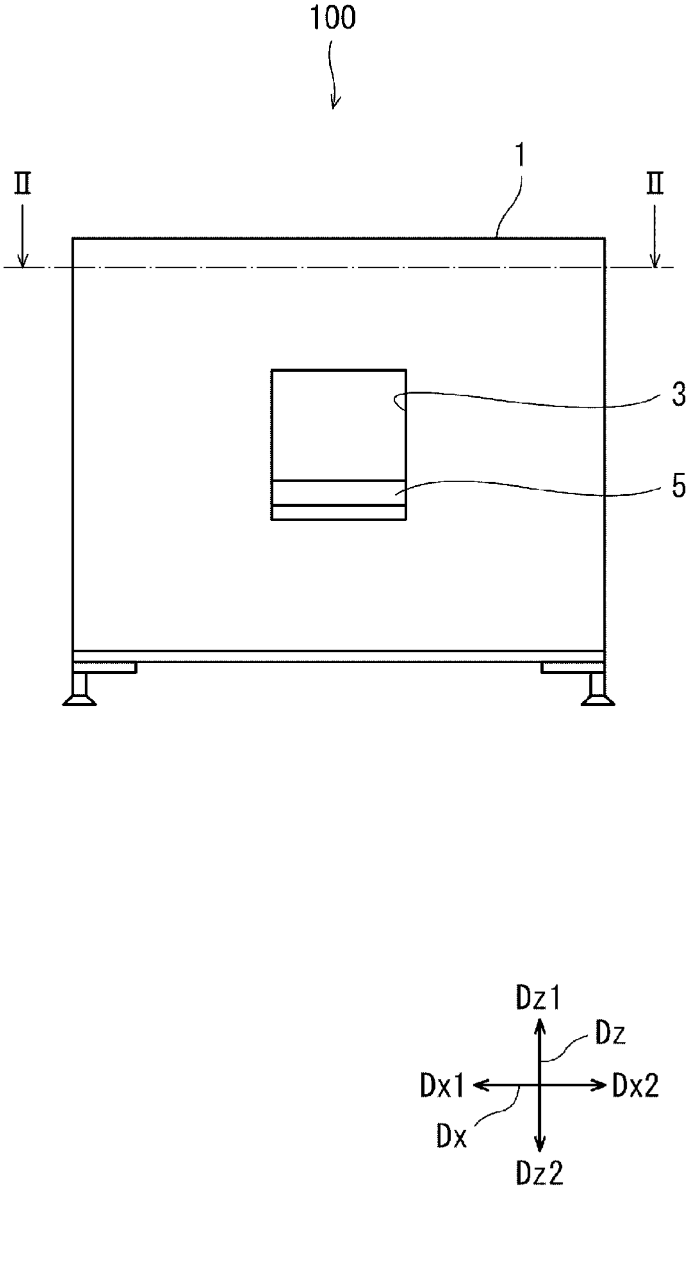
FIG. 1 is a front view of a printing apparatus according to an embodiment.
Figure 2:
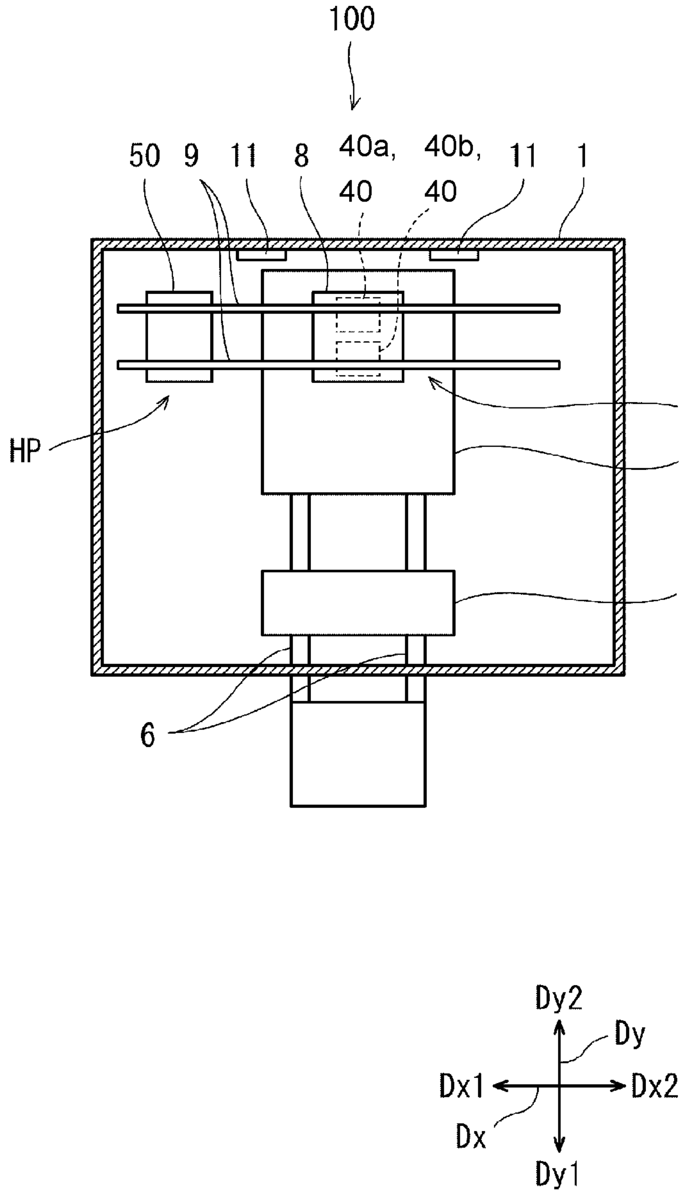
FIG. 2 is a cross-sectional view of the printing apparatus of FIG. 1 taken along a line II-II.

FIG. 1 is a front view of the printing apparatus 100 according to the embodiment. FIG. 2 is a cross-sectional view of the printing apparatus 100 of FIG. 1 taken along a line II-II. In FIGS. 1 and 2, directions orthogonal to one another are referred to as a first direction Dx, a second direction Dy, and a third direction Dz. The first direction Dx is, for example, a left-right direction (a main scanning direction, a movement direction), the second direction Dy is, for example, a front-rear direction, and the third direction Dz is, for example, an upper-lower direction. One side of the first direction Dx is denoted by Dx1, and an opposite direction of the direction Dx1 is denoted by Dx2. One side of the second direction Dy is set as a conveying direction Dy2, and an opposite direction of the direction Dy2 is denoted by Dy1. One side of the third direction Dz is denoted by Dz1, and an opposite direction of the direction Dz1 is denoted by Dz2. However, all of the above directions are examples and are not limited.

As shown in FIGS. 1 and 2, the printing apparatus 100 includes a housing 1, a platen 5, guide rails 6, a pretreatment device 43, a carriage 8, guide rails 9, air blowers 11, ejection heads 40, and a cap 50.

A wall portion of the housing 1 on a direction Dy1 side is provided with, for example, a rectangular opening 3 penetrating therethrough.

The guide rails 6 are provided, for example, in pair, and extend along the second direction Dy from an inside of the housing 1 to an outside of the housing 1 through the opening 3.

The platen 5 supports a printing medium W (FIG. 5) which is a fabric. Before printing is performed on the printing medium W, the platen 5 is located on end portions of the guide rails 6 on a direction Dy1 side. The platen 5 is provided on the guide rails 6 slidably along the second direction Dy. Accordingly, the printing medium W supported by the platen 5 is conveyed along the conveying direction Dy2 and the direction Dy1 which is an opposite direction of the conveying direction Dy2.

The pretreatment device 43 is disposed, for example, at an upper portion inside the housing 1 and at a downstream portion of the housing 1 in a direction Dy1. The pretreatment device 43 performs pretreatment of applying a pretreatment agent containing any one of an acid, a salt, and an acid and a salt to the printing medium W. The pretreatment agent contains, for example, calcium nitrate or calcium citrate. In a case of performing printing on the printing medium W, in order to improve fixing of the white ink to the printing medium W and color development of the color inks, the pretreatment agent is applied before forming a base on the printing medium W with the white ink. When the platen 5 moves on the guide rails 6 in the conveying direction Dy2, the printing medium W can be located below the pretreatment device 43. The pretreatment agent is also referred to as a base coating agent.

The guide rails 9 are provided, for example, in pair, and are disposed on a direction Dy2 side inside the housing 1. The guide rails 9 extend along the first direction Dx. The guide rails 9 support the carriage 8 such that the carriage 8 reciprocates along the first direction Dx.

The carriage 8 supports the ejection heads 40. When the carriage 8 reciprocates along the first direction Dx, the ejection heads 40 reciprocate along the first direction Dx. In the present embodiment, for example, two ejection heads 40 are provided, and include an ejection head **40*a* and an ejection head 40*b*. The ejection head 40*a* and the ejection head 40*b* are supported by the carriage 8. The ejection head 40*a* ejects, for example, ink droplets of the white ink onto the printing medium W as a first liquid. The ejection head 40*b* ejects, for example, ink droplets of the color inks onto the printing medium W as a second liquid different from the first liquid. The ejection head 40*a* is located downstream of the ejection head 40*b* in the conveying direction Dy2. In the present embodiment, the ejection head 40*a* corresponds to a first ejection head, and the ejection head 40*b*** corresponds to a second ejection head.

The cap 50 is provided, for example, on a direction Dx1 side inside the housing 1. The cap 50 is provided at a position lower than nozzle surfaces **40*s* (FIG. 4) of the ejection heads 40*a*, 40*b*. When the carriage 8 moves on the guide rails 9 in the direction Dx1, the nozzle surfaces 40*s* of the ejection heads 40*a*, 40*b* can be located above the cap 50. Further, capping and uncapping of the nozzle surfaces 40*s* based on the cap 50** will be described in detail later.

For example, two air blowers 11 are provided. The air blowers 11 are provided on a wall portion on a direction Dy2 side inside the housing 1. One air blower 11 and the other air blower 11 are disposed to sandwich the pair of guide rails 6 in the first direction Dx, for example. Each of the air blowers 11 blows air toward the pretreatment device 43.

Figure 3:
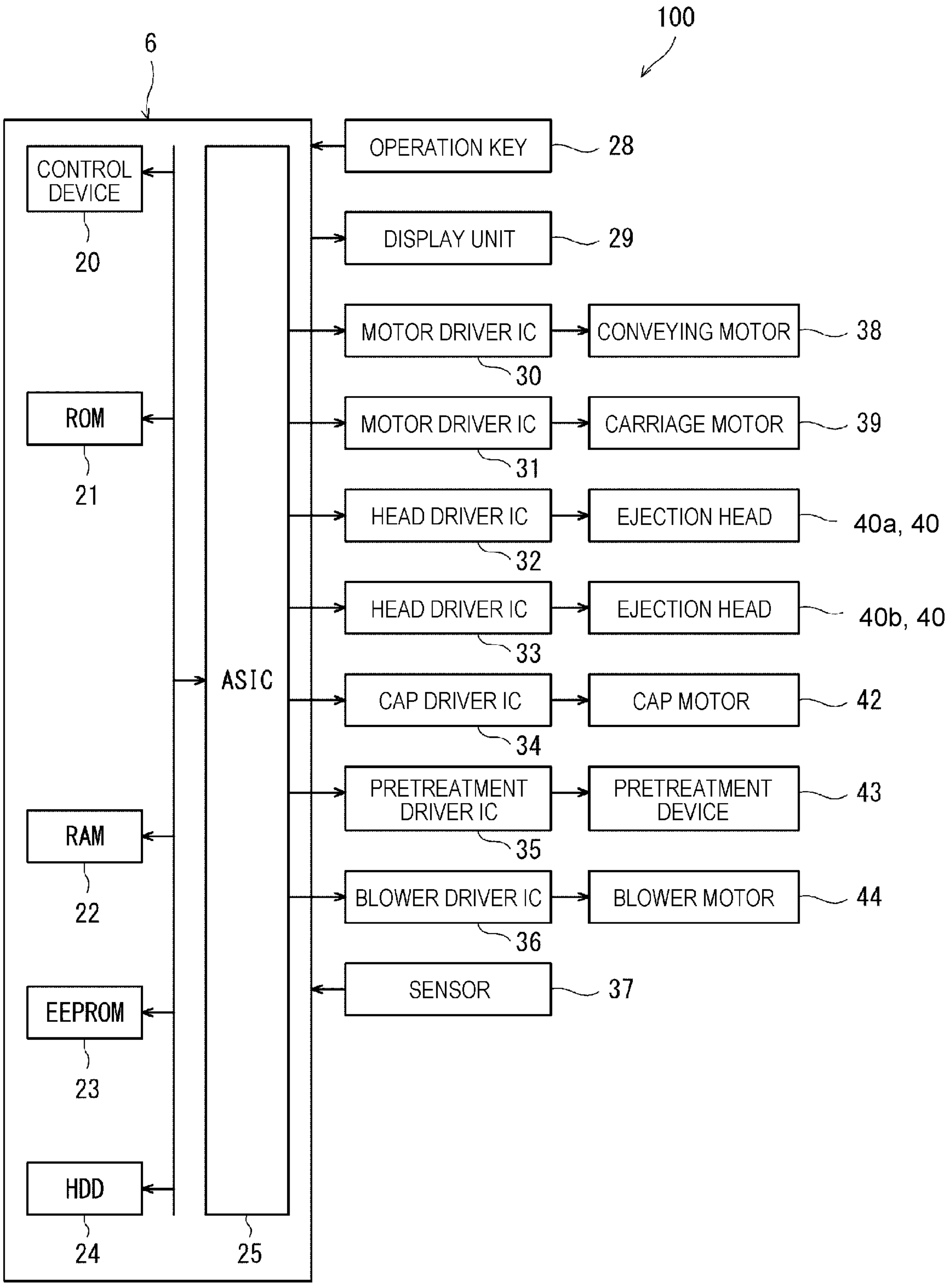
FIG. 3 is a block diagram showing a configuration of the printing apparatus of FIG. 1.

FIG. 3 is a block diagram showing a configuration of the printing apparatus 100 of FIG. 1. As shown in FIG. 3, the printing apparatus 100 includes, in addition to the above-described components, an operation key 28, a display unit 29, a controller unit 6, motor driver ICs 30, 31, head driver ICs 32, 33, a cap driver IC 34, a pretreatment driver IC 35, a blower driver IC 36, and a sensor 37. The printing apparatus 100 further includes a conveying motor 38, a carriage motor 39, a cap motor 42, and a blower motor 44.

The operation key 28 receives an operation input by a user. The display unit 29 is implemented by, for example, a touch panel and displays predetermined information. A part of the display unit 29 may function as the operation key.

The controller unit 6 implements a printing function based on an input from the operation key 28 or an external input, and controls the display of the display unit 29. The controller unit 6 includes a ROM 21, a RAM 22, an EEPROM 23, an HDD 24, an ASIC 25, and a control device 20 implemented by a CPU. The control device 20 is electrically connected to the ROM 21, the RAM 22, the EEPROM 23, the HDD 24, and the ASIC 25, and controls the driver ICs 30 to 36. The control device 20 receives a detection signal of the sensor 37.

The control device 20 executes various functions by executing a printing program stored in the ROM 21. The control device 20 may be implemented as one processor in the controller unit 6, or may be implemented as a plurality of processors that cooperate with one another. The printing program may be read by a reading device from a recording medium such as a computer-readable magneto-optical disk or a USB flash memory and stored in the ROM 21.

The RAM 22 stores image data received from the outside, a calculation result of the control device 20, and the like. The EEPROM 23 stores various types of initial setting information input by the user, a cumulative value of the number of printed sheets, and the like. The HDD 24 stores specific information which is highly confidential information whose external leakage is undesirable, various types of data, and the like.

The driver ICs 30 to 36 are connected to the ASIC 25. When receiving a printing job, the control device 20 outputs a printing command to the ASIC 25 based on the printing program. The ASIC 25 drives the driver ICs 30 to 36 based on the printing command.

The sensor 37 is provided outside the housing 1. The sensor 37 is disposed between a set position Ps to be described later and the pretreatment device 43 in the conveying direction Dy2. The sensor 37 may be, for example, a contact sensor. The sensor 37 detects whether a height of the printing medium W is equal to or greater than a predetermined value. When the height of the printing medium W is equal to or greater than the predetermined value, the sensor 37 transmits a detection signal indicating that the height of the printing medium W is equal to or greater than the predetermined value to the control device 20.

The conveying motor 38 is connected to the platen 5. When the conveying motor 38 is driven, the platen 5 reciprocates in the second direction Dy. The carriage motor 39 is connected to the carriage 8. When the carriage motor 39 is driven, the carriage 8 reciprocates in the first direction Dx. The cap motor 42 is connected to a cap switching unit 51 to be described later via, for example, a ball screw or a rack-pinion. When the cap motor 42 is driven, the cap switching unit 51 reciprocates in the third direction Dz. The blower motor 44 is connected to the air blowers 11. When the blower motor 44 is driven, the air blowers 11 blow air.

The control device 20 controls an operation of the conveying motor 38 by the motor driver IC 30. The control device 20 controls an operation of the carriage motor 39 by the motor driver IC 31. The control device 20 controls an operation of the ejection head 40*a* by the head driver IC 32, and controls an operation of the ejection head 40*b* by the head driver IC 33. The control device 20 controls an operation of the cap motor 42 by the cap driver IC 34. The control device 20 controls an operation of the pretreatment device 43 by the pretreatment driver IC 35. Further, the control device 20 controls an operation of the blower motor 44 by the blower driver IC 36.

Figure 4A:
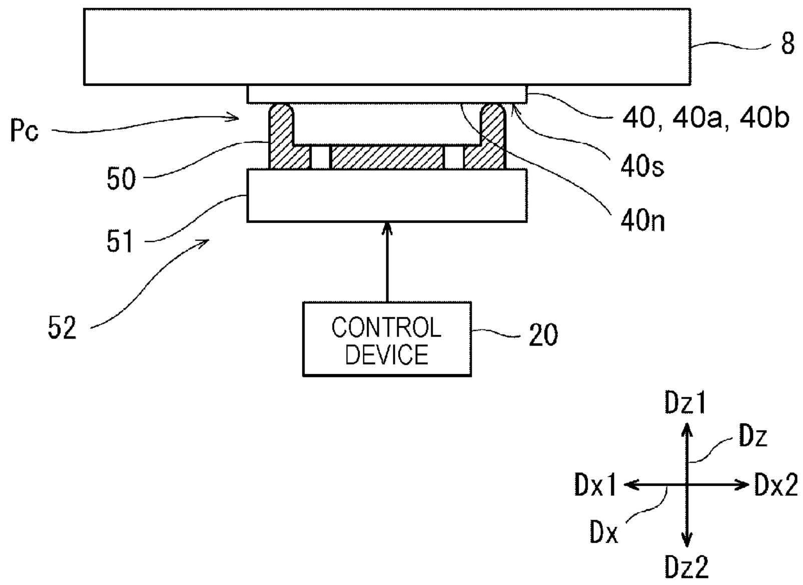
FIG. 4A is a diagram showing a state in which a cap is at a capping position.
Figure 4B:
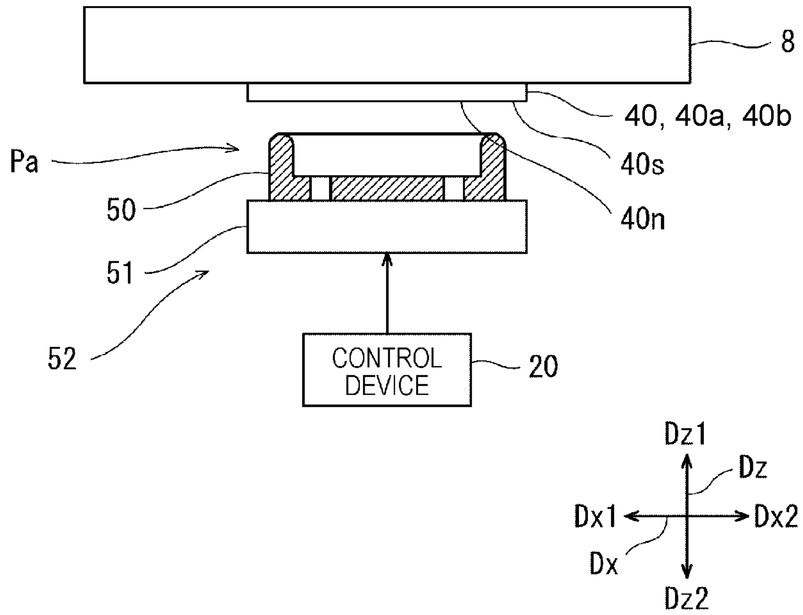
FIG. 4B is a diagram showing a state in which the cap is at an uncapping position.

FIG. 4A is a diagram showing a state in which the cap 50 is at a capping position Pc, and FIG. 4B is a diagram showing a state in which the cap 50 is at an uncapping position Pa.

As shown in FIGS. 4A and 4B, the printing apparatus 100 includes a cap switching mechanism 52. The cap switching mechanism 52 includes the cap motor 42 and the cap switching unit 51. The cap switching unit 51 supports the cap 50. The cap switching unit 51 elevates and lowers the cap 50 to switch a position of the cap 50 between the capping position Pc and an uncapping position Pa that is a position below the capping position Pc. The capping position Pc is a position where the cap 50 covers the nozzle surfaces 40*s* on which nozzles 40*n* of the ejection heads 40*a*, 40*b* are provided. On the other hand, the uncapping position Pa is a position where the cap 50 is separated from the nozzle surfaces 40*s* in the third direction Dz. In the present embodiment, the nozzle surfaces 40*s* of the ejection heads 40*a*, 40*b* are covered with one cap 50, but the present disclosure is not limited thereto, and one nozzle surface 40*s* may be covered with one cap 50. In a state where a sealed space is formed by covering the nozzle surfaces 40*s* with the cap 50 at the capping position Pc, a purge process may be performed in which the sealed space is sucked by a suction pump (not shown) to forcibly eject ink droplets from the nozzles 40*n*.

Figure 5A:
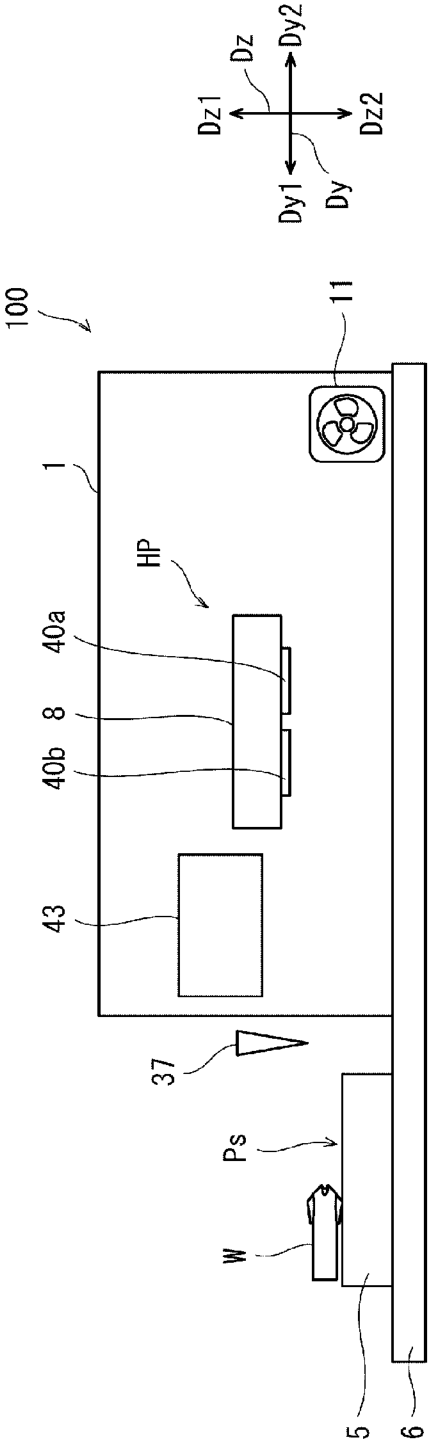
FIG. 5A is a schematic diagram showing a first step of a process in the printing apparatus.
Figure 5B:
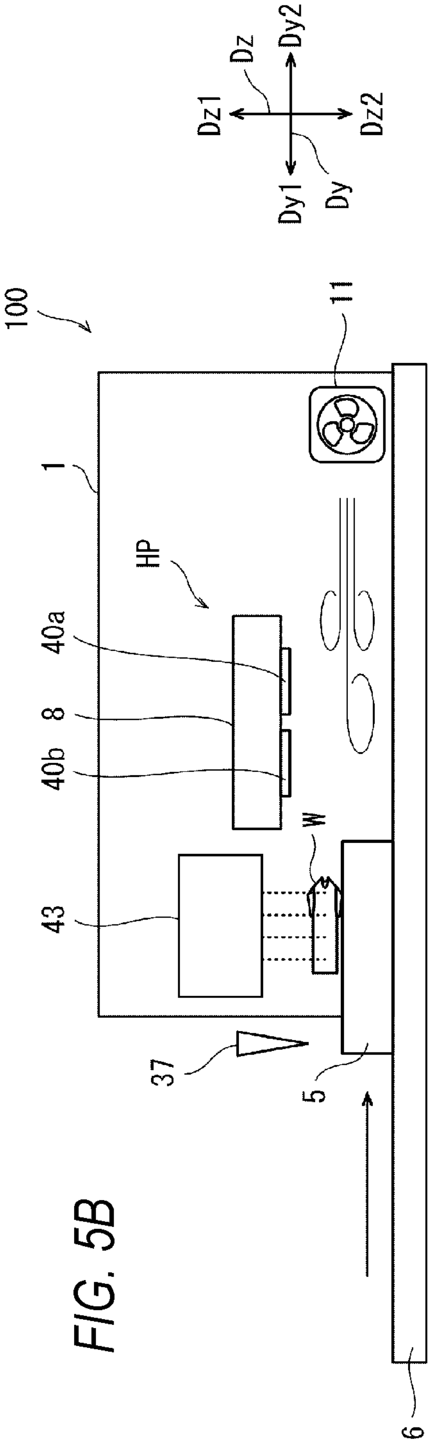
FIG. 5B is a schematic diagram showing a second step of the process in the printing apparatus.
Figure 6A:
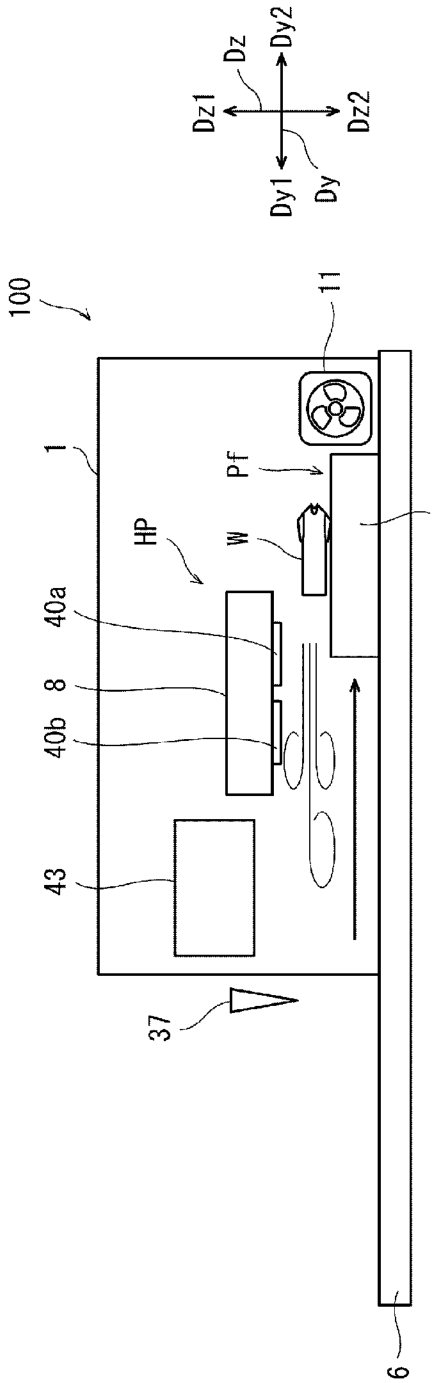
FIG. 6A is a schematic diagram showing a third step of the process in the printing apparatus.
Figure 6B:
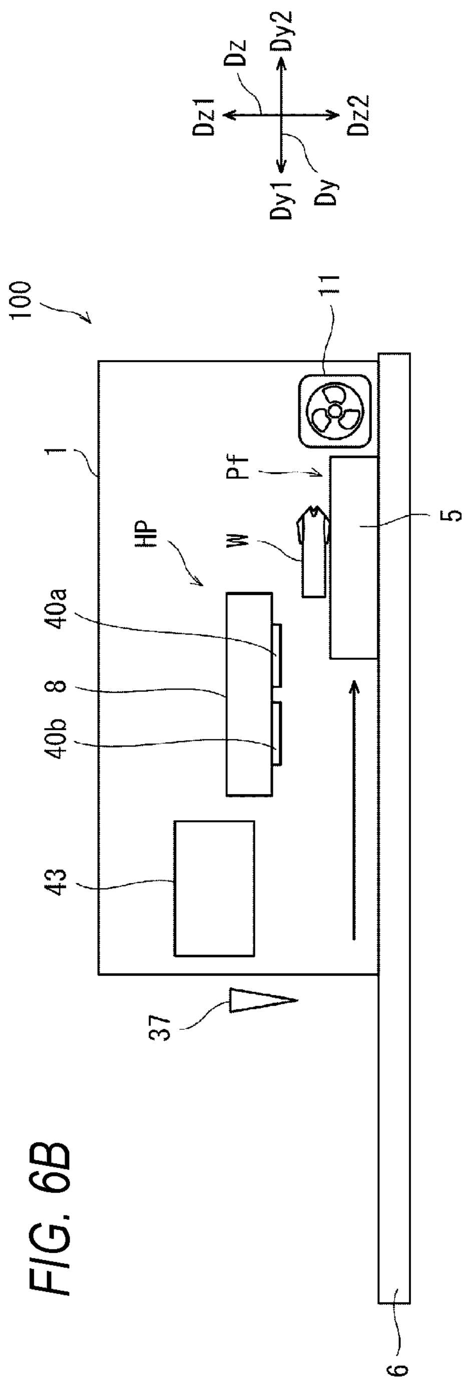
FIG. 6B is a schematic diagram showing a fourth step of the process in the printing apparatus.
Figure 7:
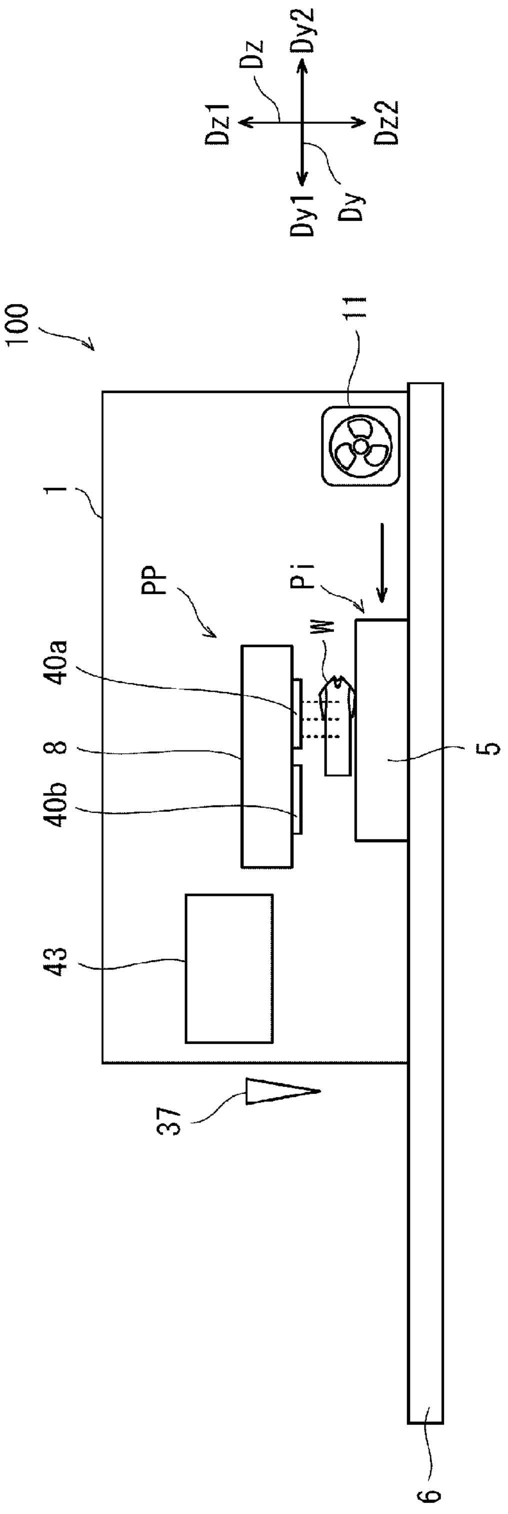
FIG. 7 is a schematic diagram showing a fifth step of the process in the printing apparatus.

Next, steps of a process in the printing apparatus 100 will be described. FIG. 5A is a schematic diagram showing a first step of the process in the printing apparatus 100, and FIG. 5B is a schematic diagram showing a second step of the process in the printing apparatus 100. FIG. 6A is a schematic diagram showing a third step of the process in the printing apparatus 100, and FIG. 6B is a schematic diagram showing a fourth step of the process in the printing apparatus 100. FIG. 7 is a schematic diagram showing a fifth step of the process in the printing apparatus 100.

As shown in FIG. 5A, the control device 20 moves the platen 5 at the set position Ps which is a position where the user sets the printing medium W on the platen 5 and is a position of the platen 5 outside the housing 1 downstream in the conveying direction Dy1. The user places the printing medium W on the platen 5 located at the set position Ps. At this time, the ejection heads 40*a*, 40*b* are located at a standby position HP in FIG. 2 where the nozzle surfaces 40*s* faces the cap 50. The standby position HP is a position of the ejection heads 40*a*, 40*b* where the nozzle surfaces 40*s* can be capped and uncapped by the cap 50. When the printing medium W is placed on the platen 5 as described above, the cap 50 is located at the capping position Pc, and the nozzle surfaces 40*s* are covered with the cap 50.

Hereinafter, a position of the ejection heads 40*a*, 40*b* that is separated from the standby position HP in the first direction Dx and at which the nozzle surfaces 40*s* face the printing medium W supported by the platen 5 and ink droplets are ejected from the nozzles 40*n* is referred to as a printing position PP. The printing position PP is located in the conveying direction Dy2 with respect to the set position Ps. A position of the platen 5 when the printing medium W supported by the platen 5 faces the nozzle surfaces 40*s* of the ejection heads 40*a*, 40*b* located at the printing position PP is referred to as a printed position Pi (FIG. 7).

Next, after receiving a printing job including a printing start instruction from the user, as shown in FIG. 5B, the control device 20 moves the platen 5 in the conveying direction Dy2 towards a position where the printing medium W supported by the platen 5 faces the pretreatment device 43. At this time, when not receiving the detection signal indicating that the height of the printing medium W is equal to or greater than the predetermined value from the sensor 37, the control device 20 conveys the printing medium W to the position facing the pretreatment device 43 by the platen 5. When receiving the detection signal from the sensor 37, the control device 20 stops the conveyance of the printing medium W performed by the platen 5.

In a case where the detection signal is not received from the sensor 27 and the platen 5 is conveyed to the position facing the pretreatment device 43, the control device 20 causes the pretreatment device 43 to apply the pretreatment agent to the printing medium W. As the pretreatment performed by the pretreatment device 43 is started, the control device 20 causes the air blowers 11 to blow air from the printing position PP toward the pretreatment device 43. Accordingly, it is possible to suppress or prevent mist of the pretreatment agent floating inside the housing 1 and the acid or the like volatilized from the pretreatment agent applied to the printing medium W from approaching the nozzle surfaces 40*s* of the ejection heads 40*a*, 40*b*.

Next, as shown in FIG. 6A, the control device 20 causes the platen 5 supporting the printing medium W to pass through the printed position Pi corresponding to the printing position PP and conveys the platen 5 to a predetermined turn-back position Pf in the conveying direction Dy2 during a period from when the pretreatment device 43 ends the pretreatment to when the ejection heads 40*a*, 40*b* start an ejection process. Thereafter, as shown in FIG. 6B, the control device 20 stops air blowing of the air blowers 11.

Subsequently, as shown in FIG. 7, the control device 20 turns back the platen 5 at the turn-back position Pf, conveys the platen 5 in the direction Dy1 opposite to the conveying direction Dy2, and stops the platen 5 at the printed position Pi corresponding to the printing position PP. Thereafter, the control device 20 drives the cap motor 42 to move the cap 50 located at the capping position Pc to the uncapping position Pa by the cap switching unit 51. Accordingly, the cap 50 is separated from the nozzle surfaces 40*s* in the third direction Dz. Then, the control device 20 causes the carriage 8 to move the ejection heads 40*a*, 40*b* located at the standby position HP to the printing position PP. By moving the cap 50 to the uncapping position Pa after the air blowing performed by the air blower 11 is stopped, drying of the ink adhering to the nozzles 40*n* due to the air blowing can be suppressed or prevented.

Next, the control device 20 causes the ejection head 40*a* to eject the ink droplets of the white ink in advance onto the printing medium W supported by the platen 5 stopped at the printed position Pi. Accordingly, a base is formed on the printing medium W. As described above, in the printing apparatus 100, there is no drying process (a process performed in an oven or heat place) before the ink droplets of the white ink are ejected onto the printing medium W on which the pretreatment is performed in advance, and a process of ejecting the ink droplets onto the printing medium W on which the pretreatment agent is in a wet state, that is, a so-called wet on wet process is performed. Then, the control device 20 further conveys the platen 5 in the direction Dy1, and causes the ejection head 40*b* to eject the color inks onto the printing medium W supported by the platen 5. Accordingly, a color image is printed on the base of the printing medium W. Instead of forming the base on the printing medium W after the platen 5 is turned back at the turn-back position Pf as described above, the base may be formed on the printing medium W by the ejection head 40*a* before the platen 5 passes through the printed position Pi. In this case, a time from when the base is formed to when the color image is printed can be made relatively long, and the fixability of the base to the printing medium W is improved.

Thereafter, the control device 20 conveys the platen 5 supporting the printing medium W on which the color image is printed to the set position Ps in the direction Dy1. The user can take out the printing medium W from the platen 5 returned to the set position Ps.

As described above, according to the printing apparatus 100 of the present embodiment, the cap 50 is moved to the uncapping position Pa after the platen 5 is turned back at the turn-back position Pf and stops at the printed position Pi. Accordingly, the cap 50 is located at the capping position Pc and covers the nozzle surfaces 40*s* while the pretreatment is being performed, and the cap 50 is moved to the uncapping position Pa after the platen 5 stops at the printed position Pi. Since the nozzle surfaces 40*s* are covered with the cap 50 while the pretreatment is being performed as described above, it is possible to reduce the possibility that the mist of the pretreatment agent remaining in the housing 1 and the acid volatilized from the pretreatment agent applied on the printing medium W react with the ink in the nozzles 40*n* before the platen 5 stops at the printed position Pi. In addition, since the cap 50 is moved to the uncapping position Pa after the platen 5 stops at the printed position Pi, the mist, the acid, and the like can be prevented from floating inside the housing 1 due to the movement of the platen 5. Accordingly, the possibility that the mist, the acid, and the like react with the ink in the nozzles 40*n* can be further reduced. As described above, the possibility of occurrence of failures such as non-ejection caused by fixing of the ink due to the reaction and discoloration of the ink on the printing medium W can be reduced.

In the present embodiment, when not receiving the detection signal indicating that the height of the printing medium W is equal to or greater than the predetermined value from the sensor 37, the control device 20 conveys the printing medium W to the position facing the pretreatment device 43 by the platen 5. Accordingly, it is possible to prevent the printing medium W having a height equal to or greater than the predetermined value from being conveyed.

Here, in the present embodiment, a variation of the timing of moving the cap 50 located at the capping position Pc to the uncapping position Pa by the cap switching unit 51 will be described. As described above, instead of moving the cap 50 to the uncapping position Pa after the platen 5 is turned back at the turn-back position Pf and stops at the printed position Pi, the cap 50 can be moved to the uncapping position Pa at the following various timings.

The control device 20 may cause the cap switching unit 51 to move the cap 50 from the capping position Pc to the uncapping position Pa after receiving the printing start instruction. In this case, in an aspect in which the pretreatment device 43 is provided separately from the printing apparatus 100, by moving the cap 50 to the uncapping position Pa after receiving the printing start instruction, it is possible to reduce the possibility that the acid or the like volatilized from the pretreatment agent applied on the printing medium W reacts with the ink in the nozzles 40*n* before receiving the printing start instruction. On the other hand, in the present embodiment in which the pretreatment device 43 is provided in the printing apparatus 100, the possibility that the mist, the acid, and the like react with the ink in the nozzles 40*n* can be reduced by moving the cap 50 to the uncapping position Pa after receiving the printing start instruction (that is, after the pretreatment performed after the printing start instruction ends).

The control device 20 may cause the cap switching unit 51 to move the cap 50 from the capping position Pc to the uncapping position Pa after the pretreatment performed on the printing medium W by the pretreatment device 43 ends. In this case, since at least the cap 50 is located at the capping position Pc and covers the nozzle surfaces 40*s* while the pretreatment is being performed, the possibility that the mist, the acid, and the like react with the ink in the nozzles 40*n* can be reduced. Further, the printing on the printing medium W can be performed more quickly than when the cap 50 is moved to the uncapping position Pa after the platen 5 stops at the printed position Pi.

The control device 20 may cause the cap switching unit 51 to move the cap 50 from the capping position Pc to the uncapping position Pa after the platen 5 supporting the printing medium W passes through the printed position Pi in the conveying direction Dy2 during a period from when the pretreatment ends to when the ejection process starts. In this case, since at least the cap 50 is located at the capping position Pc and covers the nozzle surfaces 40*s* while the pretreatment is being performed, the possibility that the mist, the acid, and the like react with the ink in the nozzles 40*n* can be reduced. Further, the printing on the printing medium W can be performed more quickly than when the cap 50 is moved to the uncapping position Pa after the platen 5 is turned back and then stops at the printed position Pi.

The control device 20 may cause the cap switching unit 51 to move the cap 50 from the capping position Pc to the uncapping position Pa after a certain period of time elapses from when the platen 5 is turned back and then stops at the printed position Pi. In this case, as compared with the case where the cap 50 is moved to the uncapping position Pa after the platen 5 stops at the printed position Pi, the mist, the acid, and the like are less likely to float inside the housing 1 due to the movement of the platen 5, and thus the possibility that the mist, the acid, and the like react with the ink in the nozzles 40*n* can be further reduced.

The control device 20 may cause the cap switching unit 51 to move the cap 50 from the capping position Pc to the uncapping position Pa after the air blower 11 is stopped. In this case, the mist, the acid, and the like are less likely to float inside the housing 1 due to the air blown by the air blower 11, and thus the possibility that the mist, the acid, and the like react with the ink in the nozzles 40*n* can be further reduced.

The present disclosure is not limited to the above-described embodiment, and modifications can be adopted. An example of such modification will be described.

Figure 8A:
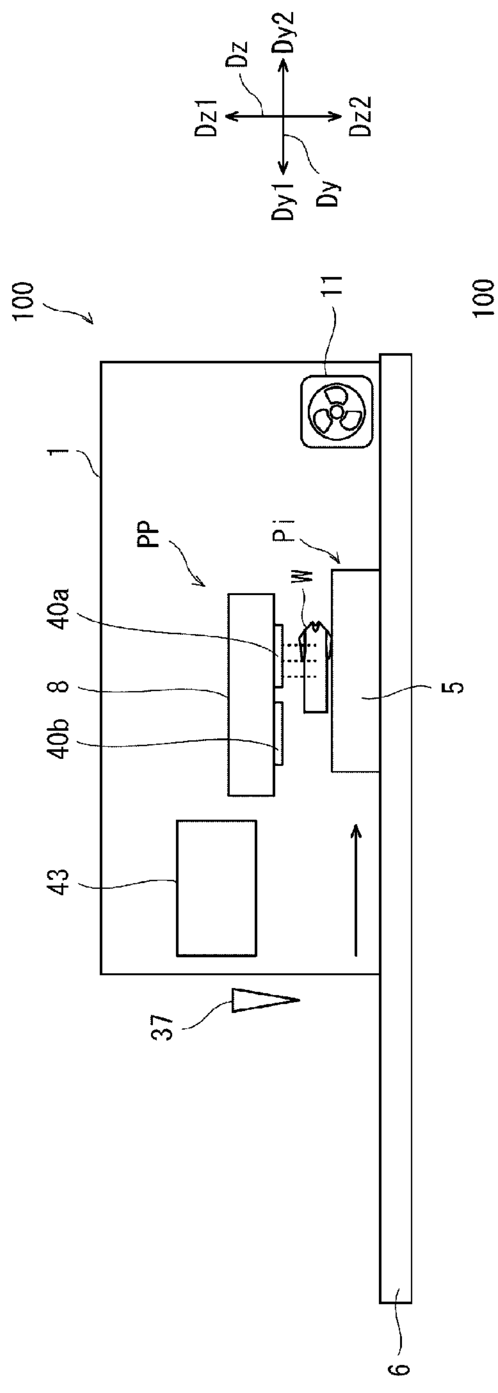
FIG. 8A is a schematic diagram showing a modification of the third step of FIG. 6A.
Figure 8B:
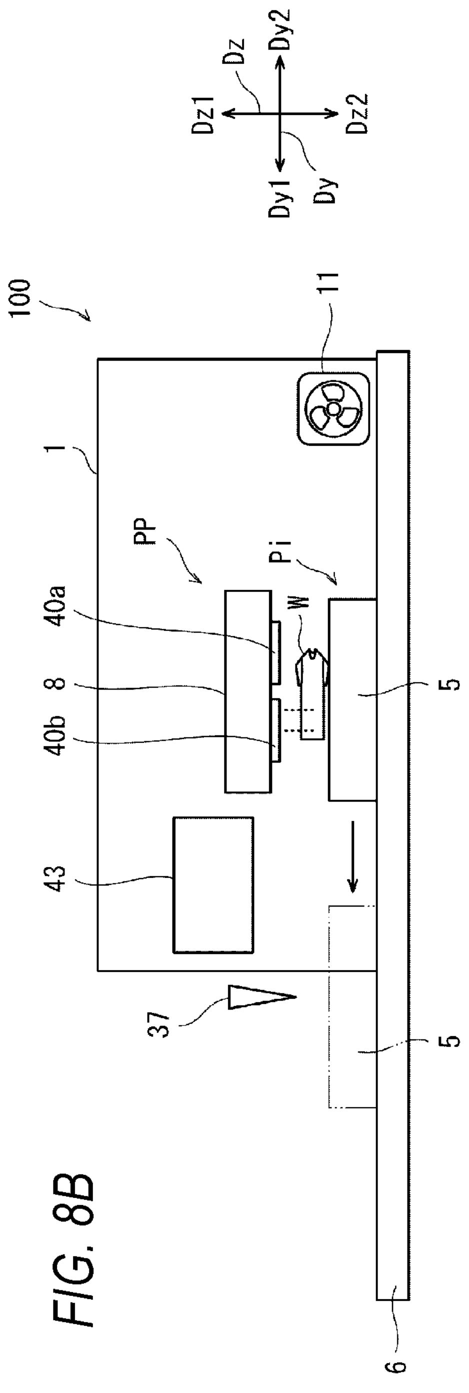
FIG. 8B is a schematic diagram showing a modification of the fifth step of FIG. 7.

FIG. 8A is a schematic diagram showing a modification of the third step of FIG. 6A, and FIG. 8B is a schematic diagram showing a modification of the fifth step of FIG. 7.

As shown in FIG. 8A, instead of conveying the platen 5 supporting the printing medium W to the turn-back position Pf, the control device 20 may convey the platen 5 to the printed position Pi in the conveying direction Dy2 and stop the platen 5 during a period from when the pretreatment device 43 ends the pretreatment to when the ejection heads 40*a*, 40*b* start the ejection process. In the modification, the control device 20 may cause the cap switching unit 51 to move the cap 50 from the capping position Pc to the uncapping position Pa before or after the platen 5 reaches the printed position Pi. In this case, the air blowing of the air blowers 11 may be stopped after the platen 5 stops at the printed position Pi. Then, the control device 20 causes the ejection head 40*a* to perform the ejection process on the printing medium W supported by the platen 5. Thereafter, as shown in FIG. 8B, the control device 20 causes the ejection head 40*b* to perform the ejection process on the printing medium W, and after the ejection process ends, the control device 20 conveys the platen 5 to the set position Ps in the direction Dy1. That is, in the present modification, the platen 5 is not moved to the turn-back position Pf, but turned back at the printed position Pi and moved in the direction Dy1.

As described above, the control device 20 causes the platen 5 to pass through the printed position Pi in the conveying direction Dy2 and to be turned back at the turn-back position Pf, and then conveys the platen 5 in the direction Dy1 and stops the platen 5 at the printed position Pi. In this case, the control device 20 may cause the cap switching unit 51 to move the cap 50 from the capping position Pc to the uncapping position Pa after causing the platen 5 to pass through the printed position Pi in the conveying direction Dy2.

Further, the following process may be performed during a period after the ejection head 40*a* performs the ejection process of the white ink and before the ejection head 40*b* performs the ejection process of the color inks. After the ejection process of the white ink and before the ejection process of the color inks, the control device 20 moves the carriage 8 away from the platen 5 in the first direction Dx such that the carriage 8 does not overlap the platen 5 in a plan view. Thereafter, the control device 20 may cause the platen 5 to convey the printing medium W in the second direction Dy to the printing position of the ejection head 40*b*, and then move the carriage 8 toward the platen 5 in the first direction Dx such that the ejection head 40*b* is located at the printing position, and cause the ejection head 40*b* to perform printing. In this case, by retracting the carriage 8 from above the platen 5 during a period after the ejection head 40*a* performs the ejection process of the white ink and before the ejection head 40*b* performs the ejection process of the color inks, the ejection heads 40*a*, 40*b* can be kept as far away as possible from an environment in which the mist, the acid, and the like floats in the housing 1 due to the movement of the platen 5. This can further reduce the possibility that the mist, the acid, and the like react with the ink in the nozzles 40*n*.

As described above, after separating the carriage 8 from the platen 5 in the first direction Dx, the control device 20 may move the cap 50 to the capping position Pc to cover the nozzle surfaces 40*s* with the cap 50. Further, the control device 20 may move the cap 50 to the uncapping position Pa before moving the carriage 8 toward the platen 5. In this case, the possibility that the mist, the acid, and the like react with the ink in the nozzles 40*n* can be further reduced.

Further, in the above-described embodiment, the pretreatment device 43 is provided as a component of the printing apparatus 100, and the pretreatment is performed by the pretreatment device 43 after the printing medium W is placed on the platen 5 located at the set position Ps, but the present disclosure is not limited thereto. The pretreatment device 43 may be provided separately from the printing apparatus 100. In this case, before the printing medium W is placed on the platen 5 located at the set position Ps, the pretreatment is performed on the printing medium W by the pretreatment device provided separately from the printing apparatus 100.

Further, in the above-described embodiment, the pretreatment device 43 is provided inside the housing 1, but is not limited thereto, and may be provided outside the housing 1.

In the above-described embodiment, the sensor 37 is disposed between the set position Ps and the pretreatment device 43 in the conveying direction Dy2, but is not limited thereto. The sensor 37 may be disposed inside the housing 1 and between the pretreatment device 43 and the printing position Pi in the conveying direction Dy2.

Further, in the above-described embodiment, the sensor 37 is disposed between the set position Ps and the pretreatment device 43 in the conveying direction Dy2 and outside the housing 1, but is not limited thereto. The sensor 37 may be disposed between the set position Ps and the pretreatment device 43 in the conveying direction Dy2 and inside the housing 1.

Further, in the above-described embodiment, the ejection head 40*a* is disposed downstream the ejection head 40*b* in the conveying direction Dy2 in the carriage 8, but is not limited thereto, and the ejection head 40*a* may be disposed upstream the ejection head 40*b* in the conveying direction Dy2.

Further, in the above-described embodiment, the cap motor 42 is provided as a drive source of the cap switching unit 51, and the cap switching unit 51 is configured to move the cap 50 to the capping position Pc or the uncapping position Pa by driving the cap motor 42, but the present disclosure is not limited thereto. Instead of providing the cap motor 42 as the drive source, a link member that connects the carriage 8 and the cap 50 may be provided to mechanically change the position of the cap 50 as the carriage 8 moves.

Further, in the above-described embodiment, two ejection heads 40 (the ejection head 40*a* and the ejection head 40*b*) are provided in the carriage 8, but the present disclosure is not limited thereto, and the carriage 8 may be provided with one or three or more ejection heads 40.

Further, in the above-described embodiment, two air blowers 11 are provided, but the present disclosure is not limited thereto, and one or three or more air blowers 11 may be provided.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A printing apparatus comprising:

a platen configured to convey, in a conveying direction, a printing medium to be subjected to a pretreatment for applying a pretreatment agent containing any one of an acid, a salt, and an acid and a salt before or after the platen is located at a set position;

an ejection head having a nozzle surface provided with a nozzle and configured to perform an ejection process of ejecting a liquid from the nozzle onto the printing medium conveyed by the platen at a printing position that is located at a downstream position in the conveying direction with respect to the set position;

a cap configured to cover the nozzle surface; and a cap switching mechanism configured to switch a position of the cap between a capping position where the nozzle surface is covered with the cap and an uncapping position where the nozzle surface and the cap are separated from each other, wherein the cap switching mechanism moves the cap to the uncapping position after a printing start instruction is received, wherein the cap is moved to the uncapping position during a period of time between an end of the pretreatment and a start of the ejection process.

2. The printing apparatus according to claim 1, further comprising:

a control device;

a pretreatment device disposed between the set position and the printing position and configured to perform the pretreatment; and a sensor disposed between the set position and the pretreatment device or between the pretreatment device and the printing position in the conveying direction and configured to detect whether a height of the printing medium is equal to or greater than a predetermined value, wherein the control device executes a process in which the printing medium located at the set position is conveyed by the platen in the conveying direction, and then the pretreatment device performs the pretreatment when a detection signal indicating that the height of the printing medium is equal to or greater than the predetermined value is not received from the sensor, and wherein the cap switching mechanism moves the cap to the uncapping position after the pretreatment ends.

3. The printing apparatus according to claim 1, further comprising:

a control device, wherein the control device executes, during a period from when the pretreatment ends to when the ejection process starts, a conveying process in which the platen supporting the printing medium is conveyed to the printing position in the conveying direction, or the platen supporting the printing medium is conveyed in the conveying direction passing through the printing position, and then is turned back at a predetermined turn-back position and conveyed to the printing position in an opposite direction of the conveying direction, and wherein the cap switching mechanism moves the cap to the uncapping position before the platen is conveyed in the conveying direction and reaches the printing position or after the platen passes through the printing position in the conveying process.

4. The printing apparatus according to claim 3, wherein the control device executes a first process of conveying the platen in the conveying direction and stopping the platen at the printing position, or a second process of turning back the platen at the turn-back position, conveying the platen in the opposite direction, and stopping the platen at the printing position, and wherein the cap switching mechanism moves the cap to the uncapping position after the first process or the second process ends.

5. The printing apparatus according to claim 4, wherein the cap switching mechanism moves the cap to the uncapping position after a predetermined time elapses since the platen is stopped at the printing position.

6. The printing apparatus according to claim 1, further comprising:

a control device;

a pretreatment device disposed between the set position and the printing position and configured to perform the pretreatment; and an air blower configured to blow air from the printing position toward the pretreatment device, wherein the control device stops the air blower after receiving the printing start instruction, and wherein the cap switching mechanism moves the cap to the uncapping position after the air blower is stopped.

7. The printing apparatus according to claim 1, further comprising:

a control device, wherein the ejection head includes:

a first ejection head configured to eject a first liquid onto the printing medium, and a second ejection head configured to eject a second liquid different from the first liquid onto the printing medium, wherein the printing apparatus further comprises a carriage configured to move in a predetermined movement direction while supporting the first ejection head and the second ejection head, and wherein, after the first liquid is ejected by the first ejection head and before the second liquid is ejected by the second ejection head, the control device separates the carriage from the platen in the movement direction such that the carriage does not overlap the platen in a plan view, causes the platen to convey the printing medium in the conveying direction to a printing position of the second ejection head, moves the carriage toward the platen along the movement direction such that the second ejection head is located at the printing position, and causes the second ejection head to perform printing.

8. The printing apparatus according to claim 7, wherein the cap switching mechanism moves the cap to the capping position after the carriage is separated from the platen in the movement direction, and moves the cap to the uncapping position before the carriage is moved toward the platen along the movement direction.

* * * * *